Sept. 25, 1956  R. Q. ARMINGTON  2,764,210
TIRE TRACK-WITH VARIABLE PIN CENTERS
Filed Dec. 19, 1952  2 Sheets-Sheet 1

INVENTOR.
Raymond Q. Armington
BY
Hyde, Meyer, Baldwin & Doran
ATTORNEYS.

INVENTOR.
Raymond Q. Armington
BY
Hyde, Meyer, Baldwin & Doran
ATTORNEYS

United States Patent Office 2,764,210
Patented Sept. 25, 1956

2,764,210

TIRE TRACK—WITH VARIABLE PIN CENTERS

Raymond Q. Armington, Shaker Heights, Ohio, assignor, by mesne assignments, to General Motors Corporation, Detroit, Mich., a corporation of Delaware Application December 19, 1952, Serial No. 326,988

3 Claims. (Cl. 152—182)

This invention relates to improvements in a combination of a large pneumatic tire and an endless track completely surrounding and partially embracing the tire, said track comprising a plurality of shoes with articulating connections between adjacent shoes, and these articulating connections being extendible and contractible so that interfitting ridges and grooves in the tire and track may remain in engagement both when the tire is flattened against the ground and when the tire resumes its natural contour in its non-ground engaging portions.

This invention is applicable to a pneumatic tire of a construction and having a normal working pressure such that the ground engaging portion of the tire flattens under load. Such a tire is molded with evenly spaced grooves extending generally crosswise of its tread around the entire periphery of the tire. The track is composed of a plurality of rigid shoes having ridges which fit into the tire grooves at all times. Obviously, as the tire flattens under load at its ground engaging portion, the grooves there have a reduced spacing as compared with the spacing "as molded" around the rest of the tire. An object of the present invention is to provide a track so that the ridges may remain in their associated grooves at all times.

One manner of achieving the above described purpose is to provide lost motion connections between adjacent shoes so that the pin centers are movable.

Another manner of carrying out the above purpose is to provide rubber bushings where the hinge pins pass through the shoes so as to provide yieldable pin centers between adjacent shoes.

Other objects and advantages of my invention will be apparent from the accompanying drawings and description and the essential features thereof will be set forth in the appended claims.

In the drawings,

Fig. 4 is a fragmental side elevational view showing a modified form of my invention with the track portion thereof broken away in central sectional view to more clearly show the construction; while

Figure 1:
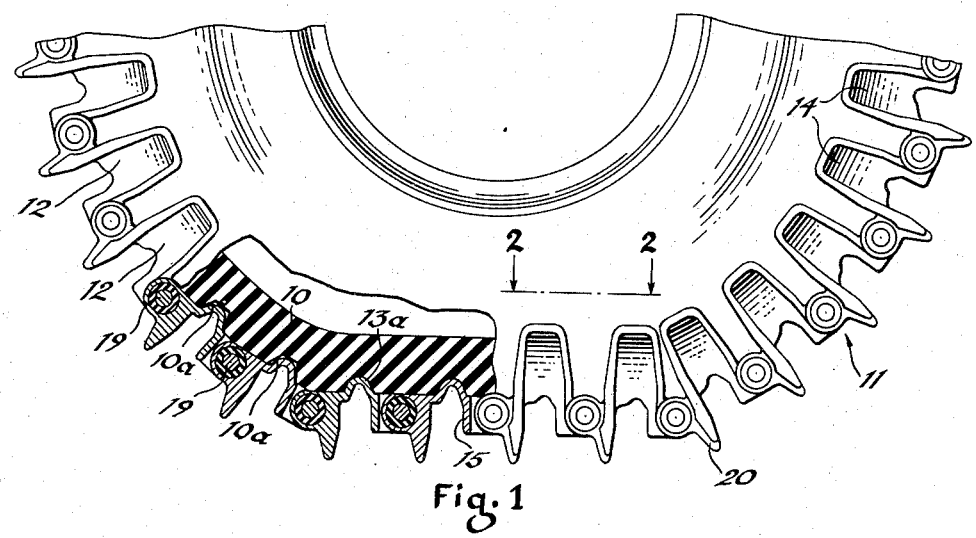
Fig. 1 is a fragmental side elevational view showing a pneumatic tire with my improved endless track in position on the tire, with the entire combination under load, and a portion thereof being broken away in central sectional view so as to more clearly show the construction.

Off-the-highway vehicles use large pneumatic tires both for the purpose of carrying the load, and for the purpose of floating the load on a large supporting area, which is especially necessary where ground conditions are poor for supporting loads, such as in mud and sand. With the increasing use of greater power for driving such vehicles, it is necessary to increase the tractive effect of such tires in order to handle the loads involved. The present invention applies an endless track of metal shoes surrounding the entire tread of the tire and extending slightly around the side walls of the tire so as to give a protective effect to the pneumatic tire, and at the same time to increase the tractive effect when such tires are driven in order to propel the vehicle. It is important that an endless track of this type be firmly engaged with the tire at all times so that the tire does not slip within the track and so wear away the rubber.

The tire illustrated herein is an 18.00 x 25 tire which means that its overall diameter is approximately five feet. My invention is intended for successful operation with such a tire utilizing internal pressures of 25 to 35 pounds per square inch, or sometimes less.

The tire 10 illustrated herein is of this character. It will be understood that such tires usually have inner tubes, but for clarity the inner tube has been omitted from Figs. 1 and 4.

The tire here shown has evenly spaced parallel grooves 10a molded in its tread portion. The grooves are here illustrated as being at about 30 degrees to a line extending around the center of the tread but wherever in the specification and claims I have called for "evenly spaced grooves" I intend to include grooves or recesses extending generally crosswise of the tire at any angle and sufficient to receive ridges in the shoes of the track so that the track and tire are geared together.

The track 11 is composed of a plurality of rigid shoes, preferably of steel or iron, and having articulating or hinged connections between adjacent shoes. One of these shoes 12 is more clearly seen in Figs. 2 and 3. Preferably, each shoe is longer crosswise of the tire than its extent circumferentially of the tire. Each shoe has a generally flat tread-engaging inner surface 13 which is provided with an upstanding ridge 13a so positioned as to extend into the grooves 10a of the tire tread. In the present instance, each shoe has a single ridge 13a extending at an angle of about 30 degrees to a center line extending crosswise of the shoe. At each end, this inner surface 13 toward the tire diverges outwardly and radially inwardly when the shoe is assembled upon the tire. These wing portions I have designated 14.

Figure 2:
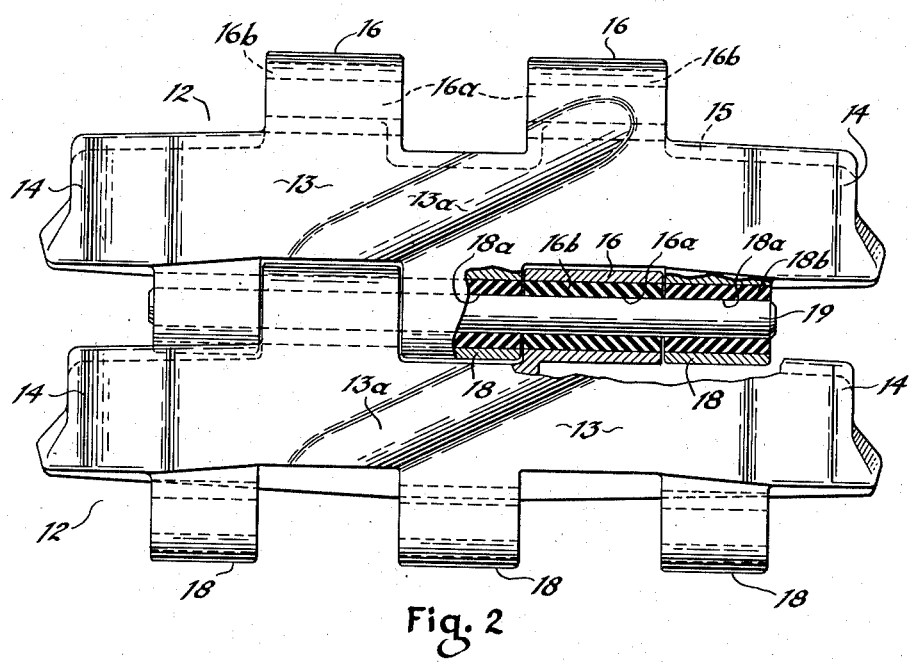
Fig. 2 is an enlarged top plan view taken from the position of the line 2—2 of Fig. 1 (with the tire omitted) showing two of the shoes of the track flattened against the ground and with a portion broken away in section to more clearly show the construction.
Figure 3:
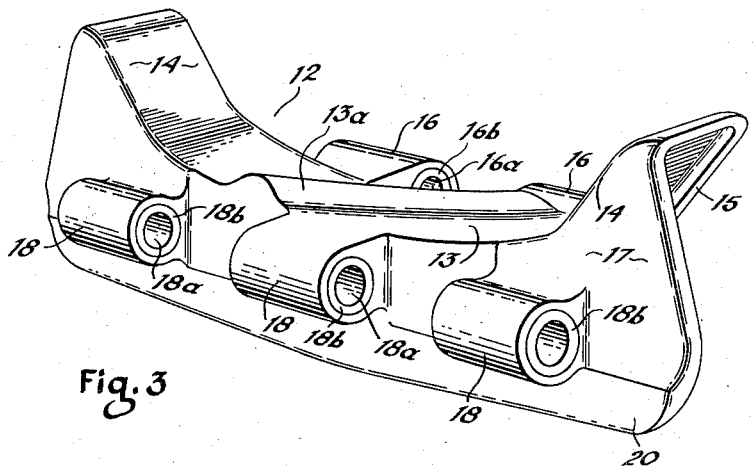
Fig. 3 is a perspective view of one of the shoes of Figs. 1 and 2.

It will be clear from an examination of Figs. 1, 2 and 3, that the portions 13 and 14 are of metal of comparatively uniform thickness, but of such a thickness to give sufficient strength to the shoe but without being very heavy. This same thickness of metal is bent downward at one side as indicated at 15 to form one leg of a generally U-shaped shoe when cut in section circumferentially of the tire. From this wall 15 there extend two hinge lugs 16 having through openings 16a to receive hinge pins. In the present invention, these openings are lined with yieldable annular bushings 16b preferably of rubber-like material. On the other side of the shoe, a wall 17 extends downwardly in Fig. 3 from the portions 13 and 14 to form another and longer leg of the U-shaped shoe. This wall 17 is approximately the same thickness as the walls 13, 14 and 15. From the wall 17, the hinge lugs 18 extend in a direction opposite to the hinge lugs 16. These lugs also have through openings 18a to receive hinge pins. In the present invention, these openings are lined with resilient annular bushings 18b, preferably of rubber-like material the same as the bushings 16b. Hinge pins 19 are then passed through the lugs 16 and 18, inside of the rubber bushings 16b and 18b. These pins are generally held in position by any suitable securing means. It will be noted that the lugs 16 and 18 are so spaced that the lugs 16 fit snugly between the lugs 18 when the track is assembled.

The wall 17 of each shoe extends radially beyond the hinge lugs 18 to provide a grouser 20 adapted to bite into the ground to aid the tractive effect. As shown, this grouser is somewhat deeper at the center of the shoe and shallower at the edges of the shoe.

In operation, the track is assembled upon the tire so that it fits tightly and with the ridge 13a of each shoe fitting into its associated groove 10a in the tire tread. Where necessary, the tire may be deflated or partially deflated until the track is assembled upon the tire, whereupon inflation of the tire will hold the track firmly in position. When the assembly is under load, as shown in Fig. 1, the normal spacing of the hinge pins 19 around the non-ground-engaging portions of the tire will correspond to the pitch or spacing of the grooves 10a in the tire as molded. When the tire and track assembly flattens against the ground, the grooves 10a assume a slightly reduced spacing and the hinge pins 19 will then compress their surrounding rubber bushings sufficiently so that the ridges 13a remain firmly embedded in the receiving grooves 10a.

It results from the above construction that the tire is geared to the track and then, by means of the grousers 20, the track is geared to the ground. The slight change in pitch of the grousers 20 as they approach the ground-flattened portion, and as they leave such portion, gives a self-cleaning action to the track. The action of the yieldable rubber bushings holds the track tight on the tire at all times and gives a yieldable follow-up so as to hold the track under tension. The rubber-like hinge pin bushings have the added advantage of being wear resistant.

Figure 4:
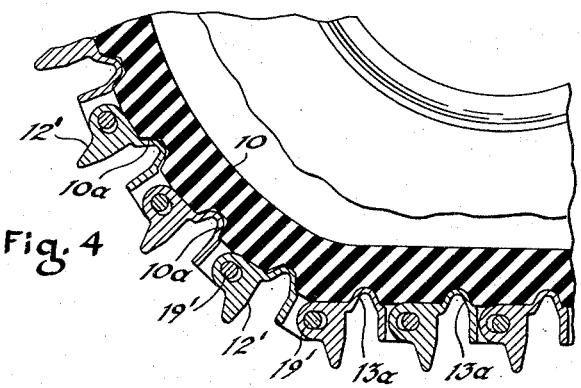
Figure 5:
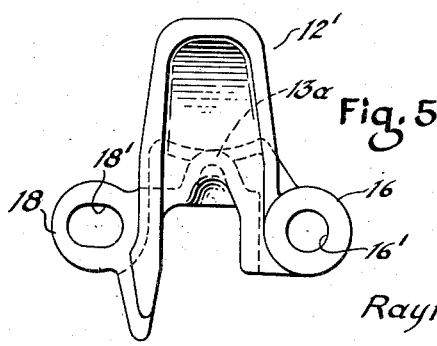
Fig. 5 is an end elevational view enlarged of one of the shoes of Fig. 4.

In the modification shown in Figs. 4 and 5, each shoe 12' is almost exactly like the shoes 12 already described. The chief difference is in the hinge pin connections. Each of the hinge lugs 16 has a substantially cylindrical central through opening 16'. Each of the hinge lugs 18 on the opposite side of the shoe has a central through opening 18' which is of elongated elliptical shape so that when the track is assembled upon the tire as shown in Fig. 4, the hinge pins 19' fit rather snugly in the opening 16' but are permitted to move backward and forward in a generally horizontal direction, as viewed in Fig. 5, in the elongated openings 18' of the hinge lug 18.

It results from this construction of Figs. 4 and 5, that when the track is assembled upon the tire, the lost motion connection between the pins 19' and the openings 18' permit the ribs 13a of each shoe to fit in the grooves 10a of the tire 10 at all times. When the grooves 10a come slightly closer together or reduce their pitch at the ground-engaging portion of the tire, then the pins 19' slide in the openings 18' to accommodate themselves to this reduced pitch. Except for the yieldable action of the rubber bushings of the first described form, this second described form carries out the same functions and has the same advantages as the first described form of my invention.

What I claim is:

1. In combination, a pneumatic tire of a construction and having a normal working pressure such that the ground-engaging portion of said tire flattens under load, said tire having evenly spaced "as molded" grooves extending crosswise of its tread around the entire periphery of said tire, said grooves lying at a reduced even spacing on said flattened ground-engaging portion when said tire is under load, an endless track completely surrounding and lightly engaging the circumference of said tire, said track comprising a plurality of shoes and yieldable articulating connections between adjacent shoes, ridges in said shoes engaging in said grooves in said tire, and said connections being extendible and contractible circumferentially of the tire entirely across said track from side to side so that said ridges may accommodate themselves to said "as molded" groove spacing and said reduced spacing while said ridges remain engaged in said grooves.

2. The combination of claim 1 wherein said connections comprise pin-and-slot connections between adjacent shoes in said track.

3. The combination of claim 1 wherein said connections comprise hinges on adjacent shoes in said track and hinge pins connecting said hinges, and resilient bushings surrounding said hinge pins, said resilient bushings being made of material compressible under the forces flattening the tire against the ground and permitting movement of said hinge pins toward each other.

References Cited in the file of this patent

UNITED STATES PATENTS

| | | |
|---|---|---|
| 1,038,235 | Toso | Sept. 10, 1912 |
| 1,307,036 | Bretscher | June 17, 1919 |
| 1,607,205 | Lord | Nov. 16, 1926 |
| 1,983,548 | Knox et al. | Dec. 11, 1934 |
| 2,046,299 | Armington | June 30, 1936 |
| 2,391,524 | Sorensen et al. | Dec. 25, 1945 |